United States Patent
Stevenson et al.

(10) Patent No.: US 6,892,924 B2
(45) Date of Patent: May 17, 2005

(54) PRECESSING RIVET AND METHOD FOR FRICTION STIR RIVETING

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 46 days.

(21) Appl. No.: 10/323,254

(22) Filed: Dec. 18, 2002

(65) Prior Publication Data

US 2004/0118900 A1 Jun. 24, 2004

(51) Int. Cl.$^7$ .............................................. B23K 37/00
(52) U.S. Cl. .................. 228/2.1; 228/112.1; 228/114.5
(58) Field of Search ............................... 228/2.1, 112.1; 411/34, 70, 171

(56) References Cited

U.S. PATENT DOCUMENTS

| 4,850,772 A | 7/1989 | Jenkins ........................ 411/171 |
| 5,058,247 A | * 10/1991 | Thomas et al. ................ 24/448 |
| 5,393,164 A | * 2/1995 | Renner et al. ............... 403/271 |
| 5,460,317 A | 10/1995 | Thomas et al. ........... 228/112.1 |
| 5,569,006 A | * 10/1996 | Alvarado et al. .............. 411/43 |
| 6,053,391 A | 4/2000 | Heidemann et al. .......... 228/2.1 |
| 6,206,268 B1 | 3/2001 | Mahoney ................. 228/112.1 |
| 6,213,379 B1 | 4/2001 | Takeshita et al. ......... 228/112.1 |
| 6,557,746 B2 | * 5/2003 | Ezumi et al. ............. 228/112.1 |
| 6,640,414 B2 | 11/2003 | Wang et al. ................... 29/456 |
| 6,676,007 B2 | 1/2004 | Stevenson et al. ........ 228/112.1 |
| 2002/0125297 A1 | * 9/2002 | Stol et al. ................. 228/112.1 |
| 2003/0192940 A1 | 10/2003 | Stevenson et al. ........ 228/112.1 |

OTHER PUBLICATIONS

"Friction Stir Welding and Processing", Jata K.V. pp. 1–13.

* cited by examiner

Primary Examiner—L. Edmondson
(74) Attorney, Agent, or Firm—Kathryn A. Marra

(57) ABSTRACT

A friction stir rivet is rotated in a precessing motion and driven through a first fusible workpiece into an engaged second fusible workpiece, causing local portions of the first and second workpieces to plasticize. When the rivet is driven through the first workpiece and into the second workpiece, rotation is stopped and the plasticized material solidifies around the rivet creating an enlarged weld joining the metal workpiece and encompassing the rivet, which provides additional mechanical strength.

15 Claims, 2 Drawing Sheets

PRECESSING RIVET AND METHOD FOR FRICTION STIR RIVETING

TECHNICAL FIELD

This invention relates to friction stir welding and riveting, more particularly, to methods of joining multiple workpieces using a precessing stir rivet to create a mechanical bond, an interweld, and a diffusion bond.

BACKGROUND OF THE INVENTION

Friction stir welding (FSW) is a method used to join metal workpieces. The method generally uses a cylindrical, shouldered tool with a profiled pin that is rotated at the joint line between two workpieces while being traversed along the joint line. The rotary motion of the tool generates frictional heat which serves to soften and plasticize the workpieces. This softened material, contributed by both workpieces, intermingles and is consolidated by the pin shoulder. As the pin moves laterally the frictional heating is reduced and the softened material hardens, creating a bond between the two workpieces. The best current understanding of the process is that no melting occurs and the weld is left in a fine-grained, hot worked condition with no entrapped oxides or gas porosity.

A common design of FSW stir rods is that the stirring element is substantially symmetrical with some irregularity to induce a stirring motion. Frequently the stir rod has a threaded appearance similar to a bolt. However, to promote intermingling and to retain the plasticized material in the weld zone for as long as possible the direction of rotation of the rod is such that the threads carry the plasticized material downward to create as turbulent a flow and as efficient an intermingling as possible. Particularly for metal workpieces the high thermal conductivity strongly localizes the region, which is plastic enough to be deformed by the stirring action. Thus, the width of the stirred region is substantially equal to the width of the stirring rod.

SUMMARY OF THE INVENTION

This invention is based on a newly developed method which we call friction stir riveting. This method improves friction stir welding by using a stir rod as a rivet. The stir rivet is rotated and advanced into multiple workpieces to plasticize material around the rivet for stir welding the workpieces together. The rivet is then left in place to form a weld between the rivet and the hardened or solidified material.

The present invention provides a modified stir rivet which includes an angled body that is asymmetrical about a rotational axis. The body preferably lies on a centerline that extends outward and downward from the rotational axis so that the body centerline processes as it rotates on the rotational axis.

The rivet has an upper and lower portion. The upper portion of the rivet includes a cap which serves as the head of the rivet and includes an upper side, an underside, and an outer face. A recessed socket is centrally located along the rotational axis of the upper side of the cap. The underside of the cap is inwardly recessed and joins with an elongated body.

The lower portion of the rivet includes the elongated body having sidewalls and a lower end surface. The body has a cross-section that increases smoothly along the length of the elongated body from the cap down to the lower end, causing the body of the rivet to have re-entrant features. The lower end of the body is bulbous, having a pear like shape. Alternative shapes for the body of the rivet include conical, cylindrical, and spherical shapes. A portion of the sidewall angles inward toward the rotational axis of the rivet, which creates a re-entrant portion along at least one side of the elongated body. The lower portion of the rivet has helical flutes which run the length of the elongated body to redirect displaced material to the lower surface of the rivet.

The cap acts as a retaining element to prevent plasticized material from displacing out of the cavity. Specifically, when the cap comes in contact with the first workpiece the inwardly recessed underside of the cap forces displaced material back into the cavity. As the material re-enters the cavity, helical flutes located on the elongated section of the rivet push material down to the lower surface of the rivet to pack material around the lower end of the rivet.

To rotate the rivet, a rotational apparatus is inserted into the recessed socket of the rivet. The recessed socket is centrally located on the upper surface of the cap and is aligned with the rotational axis of the rivet. The lower portion of the rivet is aligned along the precession axis which runs at an angle to the rotation axis. Offsetting the alignment of the lower portion of the rivet relative to the axis of rotation causes the lower portion of the rivet to move in a precessing motion when rotated.

The precessing motion of the rivet creates more contact around the sidewalls of the rivet and increases stir radius around the rivet. The extra contact between the sidewall and the workpieces to be welded promotes the stir welding process by stirring up a greater area around the rivet. As a result, more plasticized material is intermingled and inter melted. Also, the extra friction created by the precession motion of the rivet creates extra heat to further aid the process.

Scrubbing the sidewalls of the rivet removes oxidation from the rivet which allows a better bond to form between the rivet and the stirred material. If the oxidation is not removed from the sidewalls of the rivet the bond that forms between the rivet and stirred material will be adversely affected by the oxidation layer around the rivet.

Weld strength is further increased by the re-entrant section of the rivet. The elongated body of the rivet creates a re-entrant section along the angled sidewalls of the rivet. The re-entrant section extends from the lower portion of the rivet up to the underside of the cap. This design allows plasticized material to fill in between the cap and the lower surface of the rivet, thereby, increasing the volume of mechanical retention around the re-entrant section of rivet.

The rivet should be formed of a relatively high melting point metal or refractory metal so that the rivet has a higher melting point than the workpieces to be joined. Preferably, the rivet should have a melting point that is at least 100° Fahrenheit higher and more preferably at least 200° Fahrenheit higher than workpieces, such as aluminum. Further, the rivet should be formed of a metal of substantially greater hardness than the metal workpieces to be joined. Exemplary metals include high carbon steel, titanium (e.g. titanium 6–4) and the like. Preferably, the rivet should be formed of a metal that is capable of forming a diffusion bond with the metal workpieces to be joined.

A suitable rotational device is used to rotate and press the rivet into the metal workpieces to be joined. The rivet penetrates best when it is rotated at speeds between 4,500 and 27,000 revolutions per minute. The amount of pressure needed to allow the rivet to penetrate the metal workpiece depends upon the speed of rotation. The rate of penetration is increased when the amount of pressure applied is increased, or when the revolutions per minute are increased. Under good conditions, the friction stir rivet can penetrate aluminum at up to 27 millimeters per minute.

These and other features and advantages of the invention will be more fully understood from the following description of certain specific embodiments of the invention taken together with the accompanying drawings.

DESCRIPTION OF THE PREFERRED EMBODIMENT

Figure 1:
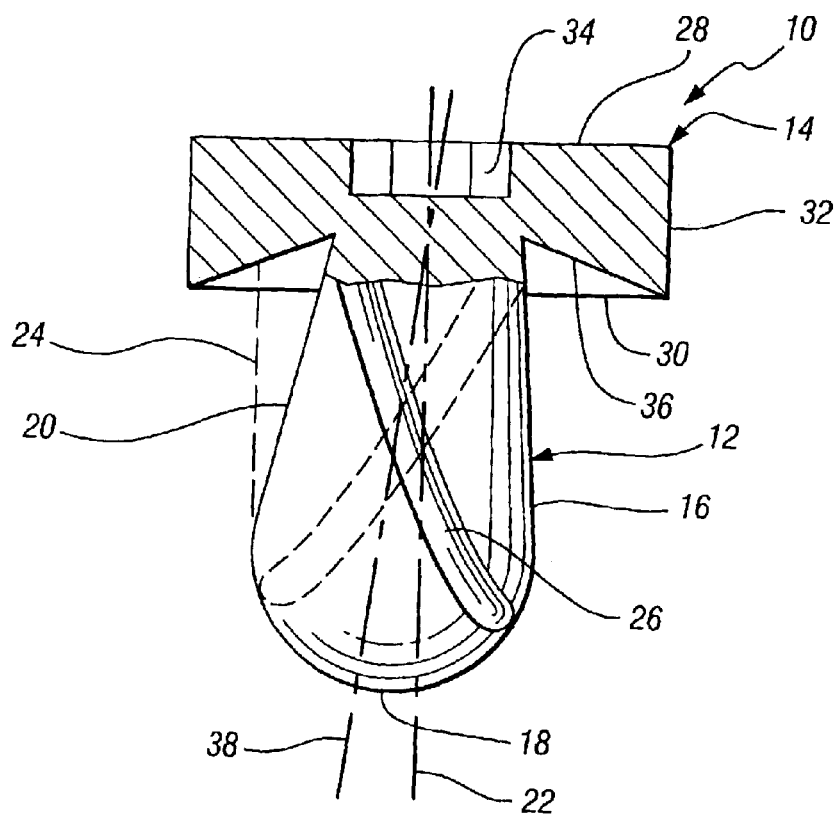
FIG. 1 is a side view of an exemplary embodiment of a friction stir rivet according to the invention.
Figure 2:
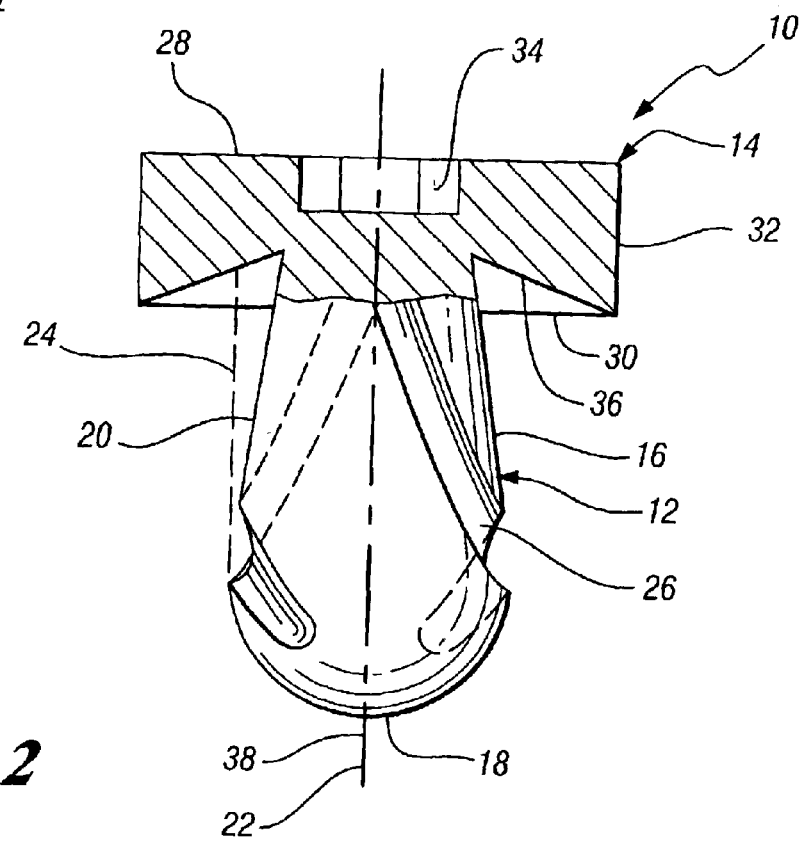
FIG. 2 is a side view of the friction stir rivet of FIG. 1 rotated 90°.

Referring first to FIGS. 1 and 2 of the drawings in detail, numeral 10 generally indicates a friction stir rivet. Rivet 10 includes an elongated stirring body 12 and a cap 14. Elongated body 12 includes a sidewall 16 and a lower end 18. The cross-section of the body 12 increases smoothly from the cap 14 down to the lower end 18, which optionally has a hemispherical shape. Sidewall 16 has an angled portion 20 that slopes inward toward the rotational axis 22 of rivet 10 to create a re-entrant section 24. The elongated body 12 has helical flutes 26.

Cap 14 acts as the head of rivet 10 and includes an upper side 28, an underside 30, and an outer face 32. A recessed socket 34 is centrally located along rotational axis 22 of the upper side 28 of the cap 14. A rotational apparatus engages recessed socket 34 to rotate and drive rivet 10. The underside 30 of the cap 14 has an inwardly recessed portion 36 which joins with the elongated body 12. The body 12 Us offset relative to the rotational axis 22 of the rivet and aligned along precession axis 38 that forms an angle with the rotational axis 22.

Figure 3:
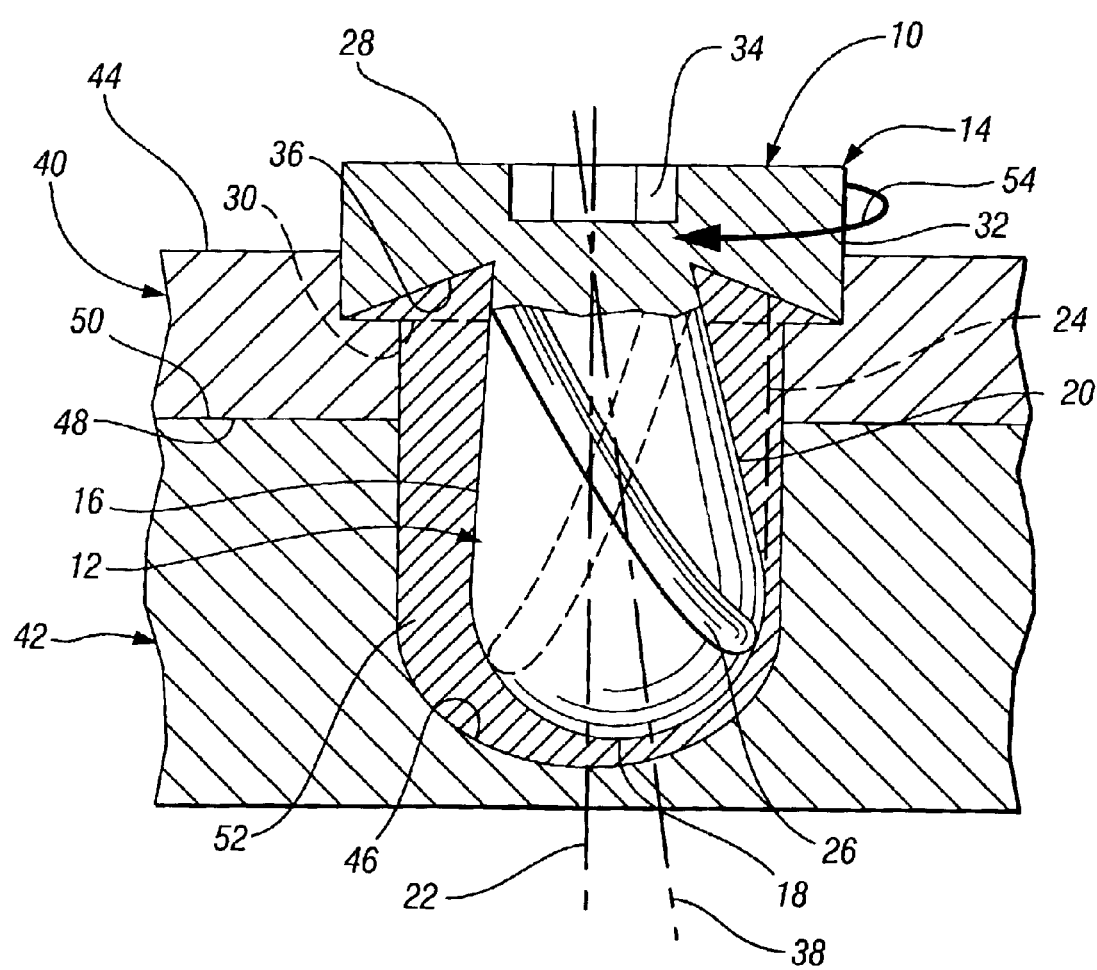
FIG. 3 is a cross-sectional view showing the friction stir rivet of FIG. 1 at the conclusion of rotation during stir riveting of two workpieces together.

Referring to FIG. 3, the rivet 10 is shown in use for stir riveting a first workpiece 40, such as a fusible aluminum sheet or plate, to a second workpiece 42, such as a fusible aluminum frame or other substrate. In operation, the rivet 10 is rotated around its rotational axis 22 while the elongated body 12, extending along the precession axis 38, rotates with the axis 38 in a precession like motion.

During rotation, downward force is applied to the rivet 10 causing the lower end 18 to frictionally contact an exposed surface 44 of the first workpiece 40. The downward force and rotation of the rivet 10 cause a portion of the first workpiece 40 to plasticize, allowing the rivet 10 to penetrate and create a cavity 46 partially or completely filled with plasticized material 52. As the rivet 10 is driven through an unexposed surface 48 of the first workpiece 40, rivet 10 frictionally contacts an unexposed surface 50 of the second workpiece 42. The downward force and rotation of rivet 10 cause a portion of the second workpiece 42 to plasticize, allowing rivet 10 to continue penetrating cavity 46. As the rivet 10 is driven through the first workpiece 40 into the second workpiece 42, the plasticized material 52 is intermixed.

As rivet 10 is further driven into workpieces 40, 42 the underside 30 of cap 14 contacts exposed surface 44, causing the cap 14 to act as a retaining element restricting plasticized material 52 from escaping during the friction stir riveting process. Specifically, the inwardly recessed portion 36 of underside 30 forces plasticized material 52 into the helical flutes 26. As the rivet is rotated in a clockwise direction as shown by direction arrow 54, the flutes 26 push plasticized material 52 down the length of rivet 10 to the lower end 18, which packs material around the lower end 18 of the rivet 10.

The precession motion of body 12 increases contact between the sidewall 16 of the rivet 10 and the cavity 46. The extra contact created by the sidewall 16 of the rivet 10 promotes the welding process by stirring up a greater area around the rivet 10, causing more plasticized material 52 to be intermingled.

The extra contact between the sidewall 16 and the cavity 46 abrades oxidation from sidewall 16. Removing oxidation around the rivet allows a better bond to form between rivet 10 and the plasticized material 52. If the oxidation is not removed from the sidewall 16 of rivet 10, the oxidation layer will interfere with chemical bonding between rivet 10 and the plasticized material 52.

Preferably, rivet 10 is driven though the first workpiece 40 and partially into the second workpiece 42 until the cap 14 of the rivet 10 is partially recessed into the exposed surface 44 of the first workpiece 40. Thereafter, the rotary motion of rivet 10 is stopped, allowing locally plasticized material 52 to solidify and form several welds. Rivet 10 forms a mechanical bond between the first workpiece 40 and the second workpiece 42. Plasticized material 52 preferably forms a diffusion bond between the rivet 10 and the first and the second workpieces 40, 42. Furthermore, the plasticized material 52 forms an interweld between the first workpiece 40 and the second workpiece 42.

The weld strength is further increased by the re-entrant sections of rivet 10. The elongated body 12 of the rivet 10 creates re-entrant sections around the sidewalls 16, 20 of the rivet 10. Re-entrant section 24 extends from the lower portion 18 of the rivet up to the underside 30 of the cap 14. This design allows plasticized material 52 to fill in between the cap 14 and the lower surface 18 of the rivet 10, thereby, increasing the strength of mechanical retention around the sidewalls 16, 20 of the rivet 10.

The foregoing description is directed, as an example, to joining aluminum metal workpieces with a stir rivet made of metal with a higher temperature melting point. However, it should be understood that other fusible materials may be joined using the same process with a proper selection of compatible materials. Thus, other metals and thermoplastics may also be successfully joined with a stirring rivet and process within the guidelines above described.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A friction stir rivet having a cap and an elongated stirring body extending downward from the cap, the body including a lower end and sidewalls that join the lower end with an underside of the cap, wherein;

the rivet has a predetermined rotational axis;

the body has a centerline that angles downward and outward from the rotational axis; and the body has a cross-section that increases smoothly from the cap to the lower end to create a re-entrant area along at least one side of the body.

2. A rivet as in claim 1 wherein the body has angled fluting along the sidewalls operative during rotation of the rivet to force flowable material downward toward the lower end of the rivet.

3. A rivet as in claim 2 wherein the cap is a disk and the underside is inwardly recessed to direct material inward toward an upper end of the fluting.

4. A rivet as in claim 1 including a rotary drive feature on the cap.

5. A rivet as in claim 1 wherein the elongated body is pear shaped to create a re-entrant portion around the sidewalls.

6. A rivet as in claim 1 wherein the elongated body is asymmetrical relative to the rotational axis.

7. A rivet as in claim 1 wherein the lower end of the body is generally hemispherical.

8. A method of joining fusible workpieces at a point of engagement, comprising the steps of;

providing a rivet with an elongated body formed of a material with a substantially higher melting point than that of the workpieces wherein the body angles outward from a rotational axis which causes the body to rotate in a precession like motion;

rotating the rivet about the rotational axis and simultaneously driving the precessing body through a first workpiece and into an engaged second workpiece, thereby creating friction between the rivet and the workpieces, that locally plasticizes an enlarged volume of material around the rivet;

stopping further rotation and inward driving of the rivet after a desired depth is reached; and cooling the workpieces and the rivet, until solidification of plasticized material occurs and the fusible workpieces are held together by the hardened or solidified material and by the rivet retained within the workpieces at the point of engagement.

9. A method as in claim 8 including forming the rivet of a material compatible with that of the fusible workpieces such that during cooling of the plasticized material surrounding the rivet a diffusion bond is created between the rivet and the surrounding material.

10. A method as in claim 8 wherein the cooling step causes interwelding of the fusible workpieces.

11. A method as in claim 8 wherein the cooling step embeds the rivet to form a mechanical bond between the joined workpieces.

12. A method as in claim 8 wherein the fusible workpiece are metal.

13. A method as in claim 8 including providing a cap on the body with a recessed underside adjacent the body to force displaced material back into a stir area around the rivet.

14. A method as in claim 8 including providing angled fluting around sidewalls of the body to direct displaced material down toward and end of the rivet.

15. A method as in claim 8 wherein the body of the rivet is asymmetrical relative to the rotational axis.

* * * * *